(12) United States Patent
Straw et al.

(10) Patent No.: US 12,066,963 B2
(45) Date of Patent: Aug. 20, 2024

(54) USB TERMINAL SERVER

(71) Applicant: SOFTIRON LIMITED, Chilworth (GB)

(72) Inventors: Phillip Edward Straw, Newark, CA (US); Stephen Hardwick, Austin, TX (US)

(73) Assignee: SOFTIRON LIMITED, London (GB)

( * ) Notice: Subject to any disclaimer, the term of this patent is extended or adjusted under 35 U.S.C. 154(b) by 0 days.

(21) Appl. No.: 17/949,354

(22) Filed: Sep. 21, 2022

(65) Prior Publication Data
US 2023/0176986 A1 Jun. 8, 2023

Related U.S. Application Data

(60) Provisional application No. 63/246,597, filed on Sep. 21, 2021.

(51) Int. Cl.
*G06F 13/38* (2006.01)
*G06F 13/42* (2006.01)

(52) U.S. Cl.
CPC ........ *G06F 13/385* (2013.01); *G06F 13/4282* (2013.01); *G06F 2213/0042* (2013.01)

(58) Field of Classification Search
CPC .............................................. G06F 2213/0042
See application file for complete search history.

(56) References Cited

U.S. PATENT DOCUMENTS

| | | | | |
|---|---|---|---|---|
| 2001/0033583 A1* | 10/2001 | Rabenko | ............... | H04M 7/125 370/429 |
| 2002/0061012 A1* | 5/2002 | Thi | .......................... | H04N 7/10 370/352 |
| 2004/0123113 A1* | 6/2004 | Mathiassen | ........... | G07F 7/1008 713/185 |
| 2007/0260905 A1 | 11/2007 | Marsden et al. | .............. | 713/323 |
| 2008/0005445 A1* | 1/2008 | Diefenbaugh | ........ | G06F 13/385 710/313 |
| 2008/0168118 A1* | 7/2008 | Hickey | ................. | G06F 13/385 709/201 |
| 2009/0210734 A1 | 8/2009 | Schramm et al. | ............ | 713/324 |

(Continued)

FOREIGN PATENT DOCUMENTS

EP 3161585 A1 2/2020 ............... G06F 1/26

OTHER PUBLICATIONS

International Search Report and Written Opinion, Application No. PCT/EP2022/076280, 11 pages, Dec. 16, 2022.

*Primary Examiner* — Henry Tsai
*Assistant Examiner* — Aurangzeb Hassan
(74) *Attorney, Agent, or Firm* — Slayden Grubert Beard PLLC

(57) ABSTRACT

A universal serial bus (USB) server includes USB connectors. Each USB connector is configured to interface via USB to an endpoint server. The server includes a terminal manager configured to issue a command to a first endpoint server via a selected one of the USB connectors. The selected USB connector is associated with and connected to the first endpoint server. The terminal manager is further configured to determine whether a response has been received to the command, and, based on a determination that no response has been received to the command, attempt to power up the first endpoint server through the selected one of USB connectors.

21 Claims, 6 Drawing Sheets

(56) References Cited

U.S. PATENT DOCUMENTS

2013/0272272 A1* 10/2013 Sudak ............... H04W 72/0446
370/336
2015/0378409 A1* 12/2015 Dunstan ............ H04L 12/40039
713/310
2020/0166985 A1* 5/2020 He ........................ G06F 1/3293

* cited by examiner

USB TERMINAL SERVER

PRIORITY

This application claims priority to U.S. Provisional Patent Application No. 63/246,597 filed Sep. 21, 2021, the contents of which are hereby incorporated in their entirety.

FIELD OF THE INVENTION

The present disclosure relates to serial communications and, more particularly, to a universal serial bus (USB) terminal server.

BACKGROUND

An out of band, serial communications channel may used to control servers. For example, servers may use a USB connection for serial communication to other servers as an out of band channel compared to an Ethernet connection between the servers. In certain circumstances a server may have been completely powered down and have no powered components. In this case, a communication to a USB interface of the powered down server is not normally possible.

Embodiments of the present disclosure address one or more of these issues.

DETAILED DESCRIPTION

Embodiments of the present disclosure may include a USB terminal server to manage and enhance multiple connections needed within, for example, a rack implementation. Specifically, the USB terminal server may allow power to be selectively applied to specific interfaces to enable a Baseboard Management Controller (BMC) to be powered from an external USB interface when no local power is available. The BMCs may be implemented within any suitable endpoint.

Embodiments of the present disclosure may include one or more terminal clients. The terminal client, endpoints, and terminal server may be implemented in any suitable manner, such as by analog circuitry, digital circuitry, instructions for execution by a processor, or any suitable combination thereof. The terminal client, endpoints, and terminal server may be implemented within, for example, any suitable server or electronic device.

One method for controlling a server from a client is to use a console application embedded into the operating system of both the client and the server. At the client side, this may be realized as a command line or graphical user interface application. At the server side, this can be realized as an embedded service provided by the operating system. This may be implemented by a point to point connection, wherein data from the client console application is exchanged with the server service to allow the client console application to supply commands that are executed on the server. Similarly, the server may send the resulting responses to the client console application using the point to point connection using, for example, Secure Shell (SSH) protocol. Using the USB terminal server, the terminal client can request a virtual connection to an endpoint. This can be done, for example, by adding a specific port to an Internet Protocol (IP) address associated with the endpoint when connecting from the client to the USB terminal server. The USB terminal server may then route the console commands and responses between the client and the respective endpoint using the virtual connection. In this manner, a single client console application can establish multiple console connections with various endpoints. This results in a USB terminal server being realized with central computing components and a set of USB endpoint interfaces. A modular approach can be used to fabricate the USB terminal server.

Figure 1A:
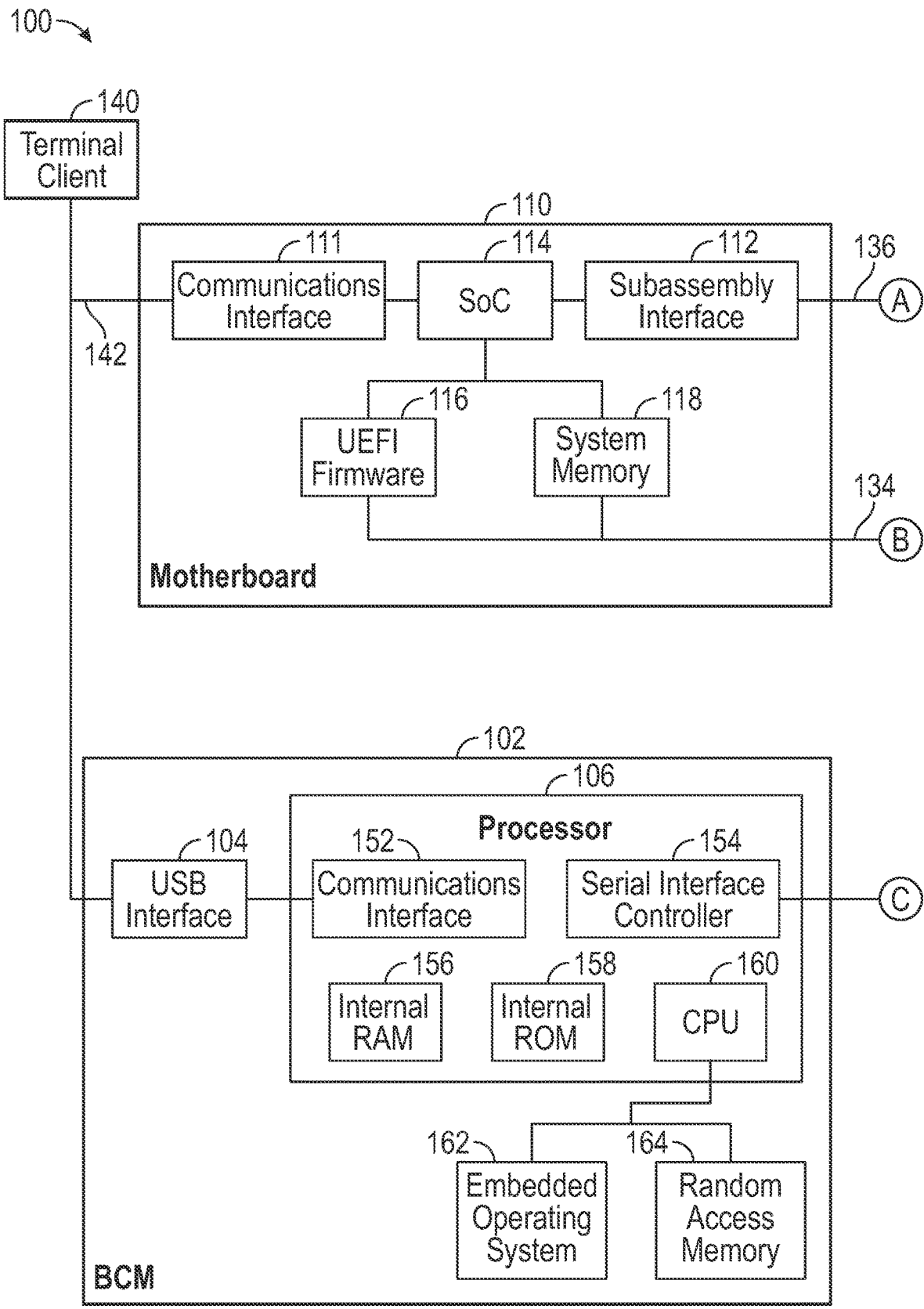
FIGS. 1A and 1B are an illustration of a system for providing a USB terminal server, according to embodiments of the present disclosure.
Figure 1B:
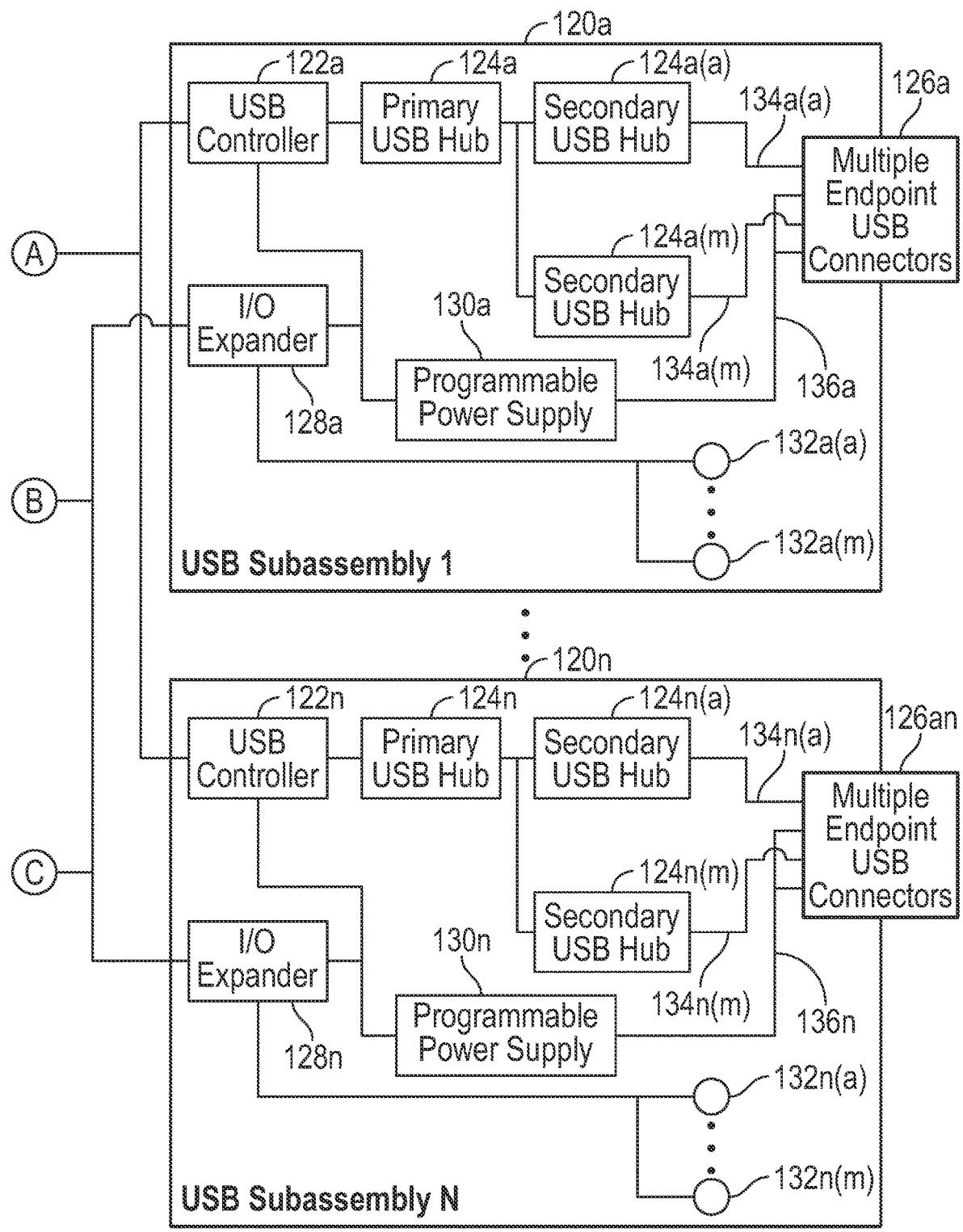

FIGS. 1A and 1B are an illustration of a system 100 for providing a USB terminal server, according to embodiments of the present disclosure. System 100 may include a terminal client 140 and a terminal server. The terminal server may include a baseboard management controller (BMC) 102, a motherboard 110, and any suitable number and kind of USB subassemblies 120A-N.

BMC 102 may be implemented in any suitable manner. BMC 102 may include a processor 106. Processor 106 may include a communications interface 152, serial control interface controller 154, internal RAM 156, internal ROM 158, and CPU 160. BMC 102 may include a USB interface 104, embedded operating system 162, and RAM 164.

Communications interface 152 may be implemented by instructions in the medium for execution by a processor (such as CPU 160), a function, library call, subroutine, shared library, software as a service, analog circuitry, digital circuitry, control logic, digital logic circuits programmed through hardware description language, application-specific integrated circuit (ASIC), field-programmable gate array (FPGA), programmable logic device (PLD), or any suitable combination thereof, or any other suitable mechanism, whether in a unitary device or spread over several devices. Communications interface 152 may be configured to utilize any suitable protocol, such as a USB protocol.

Serial control interface controller 154 may be implemented by instructions in the medium for execution by a processor (such as CPU 160), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. Serial control interface 154 may be configured to utilize any suitable protocol.

RAM 164, internal RAM 156, and internal ROM 158 may be implemented by any suitable transitory or non-transitory memory.

CPU 160 may be implemented by any suitable number and kind of processing cores.

Embedded operating system 162 may include any suitable operating system for providing for the functionality of BMC 102, and may be implemented by instructions in the medium for execution by a processor (such as CPU 160), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

USB interface 104 may be implemented by instructions in the medium for execution by a processor (such as CPU 160), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

Processor 106 may be connected to embedded operating system 162 and RAM 164. This may allow BMC 102 to become a self-contained processing system. USB interface 104 may allow external connections to a terminal client 140 of system 100. Terminal connections may be made in any suitable manner, such as by Ethernet, USB, or other types of connections. Serial interface controller 154 may use a serial interface 134 to connect to motherboard 110 and USB subassemblies 120A-N.

Motherboard 110 may be implemented in any suitable manner. Motherboard 110 may include a communications interface 111, a system on a chip (SoC) 114, Unified Extensible Firmware Interface (UEFI) firmware 116, subassembly interface 112, and system memory 118.

Communications interface 111 may be implemented by instructions in the medium for execution by a processor (such as SoC 114), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. Communications interface 111 may be configured to communicate with terminal client 140.

System memory 118 may be implemented by any suitable transitory or non-transitory memory. System memory 1118 may be accessible by or to BMC 102 or USB subassemblies 120.

UEFI firmware 116 may be implemented by instructions in the medium for execution by a processor (such as SoC 114), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. UEFI firmware 116 may be accessible by or to BMC 102 or USB subassemblies 120.

Subassembly interface 112 may be implemented by instructions in the medium for execution by a processor (such as SoC 114), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. Subassembly interface 112 may be configured to access USB subassemblies 120.

UEFI firmware 116 and system memory 118 can be accessed by BMC 102 using serial interface 134. Subassembly interface 112 can use signal lines 136 to connect to USB controllers 122 in respective subassemblies 120. Subassembly interface 112 may allow data and control information to be exchanged with USB controllers 122. Communications interface 111 may connect to external terminal client 140 using serial interface 142.

USB subassemblies 120 may be implemented in any suitable manner. Each USB subassembly may include a USB controller, a primary USB hub, one or more secondary USB hubs, a set of I/O expanders 128, a programmable power supply 130, any suitable number and kind of indicators 132, and multiple endpoint USB connectors 126.

USB controller 122 may be implemented by instructions in the medium for execution by a processor (not shown), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

Primary USB hub 124 may be implemented by instructions in the medium for execution by a processor (not shown), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

Secondary USB hubs 125 may be implemented by instructions in the medium for execution by a processor (not shown), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

Programmable power supply 130 may be implemented by instructions in the medium for execution by a processor (not shown), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

USB connectors 126 may be may be implemented by analog circuitry, digital circuitry, control logic, digital logic circuits programmed through hardware description language, ASIC, FPGA, PLD, or any suitable combination thereof, or any other suitable mechanism, whether in a unitary device or spread over several devices, and may include connectors for any suitable USB format or protocol.

Indicators 132 may be implemented by LEDs, LCD display, lamps, analog circuitry, digital circuitry, control logic, digital logic circuits programmed through hardware description language, ASIC, FPGA, PLD, or any suitable combination thereof, or any other suitable mechanism, whether in a unitary device or spread over several devices.

I/O expanders 128 may be implemented by instructions in the medium for execution by a processor (not shown), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

USB controller 122 may connect to primary USB hub 124. Primary USB hub 124 may expand USB connections to secondary USB hubs 124. This may allow USB controller 122 to connect to multiple external USB connectors 126 connected to each of secondary USB hubs 124 via standard USB data signal lines (e.g., data+ and data− lines). USB controllers 122, via subassembly interface 136, can allow SoC 114 to selectively connect to any of USB connectors 126. SoC 114 can also send commands to BMC 102 using system memory 118 via serial interface 134. Commands in system memory 118 can instruct BMC 102 to send instructions to USB subassemblies 120. BMC processor 106 may interpret the command and, using serial interface controller 154, serial interface 134, and respective I/O expander 128, send commands to programmable power supply 130 on USB subassembly 120. This may cause programmable power supply 130 to provide or remove power to or from a specific endpoint USB connector(s) of connectors 126 using signal lines 136 that connect in turn to standard USB power signal lines (e.g., Vcc and ground). BMC 102 can control indicators 132 on each of subassemblies 120. Displays 132 may be associated with individual USB endpoint connectors 126 for each subassembly 120. Displays 132 can be used to signal the status of external servers, such as endpoints, connected to a USB terminal server.

Figure 2A:
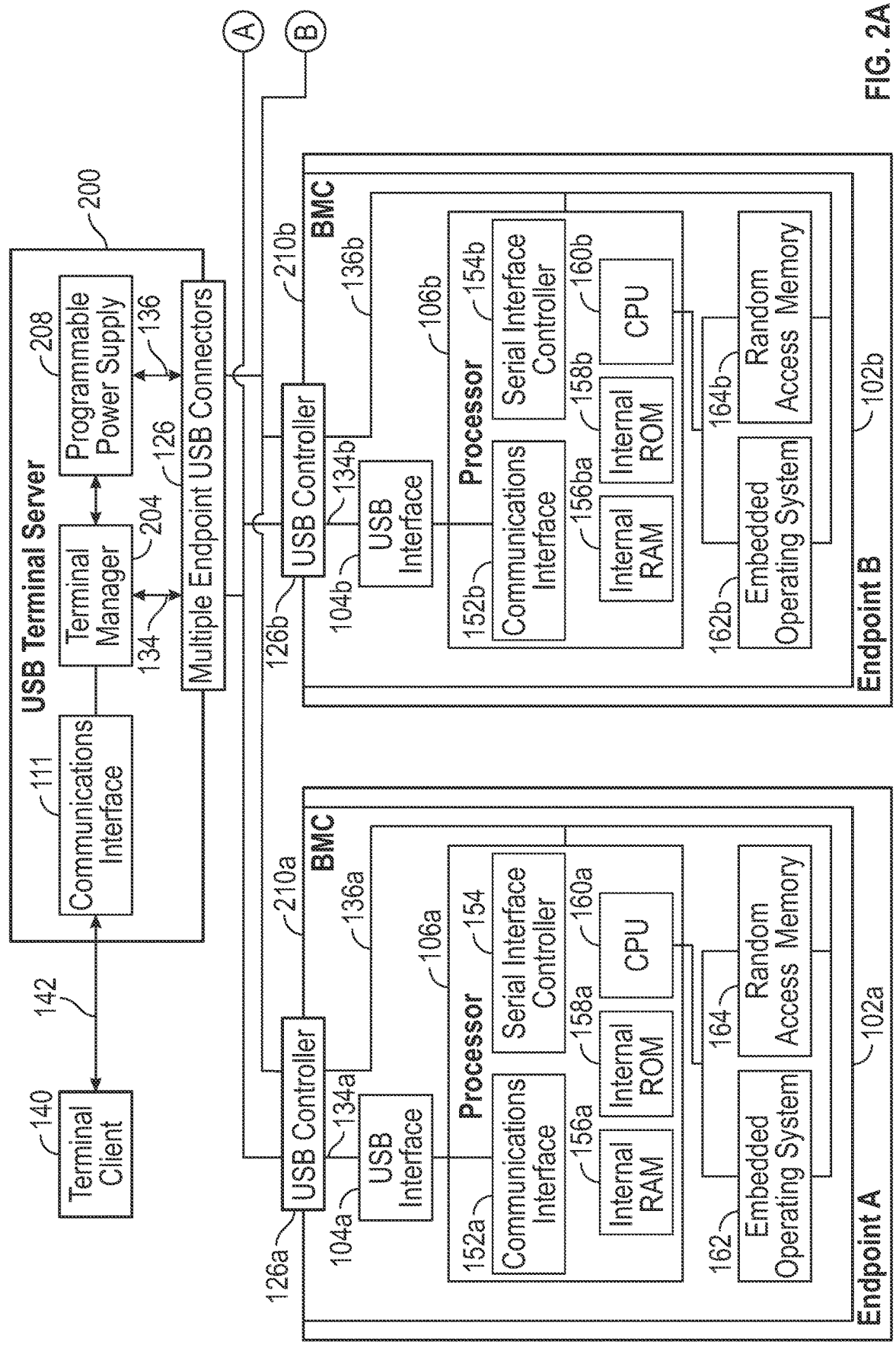
FIGS. 2A and 2B are another illustration of the system for providing a USB terminal server, according to embodiments of the present disclosure.
Figure 2B:
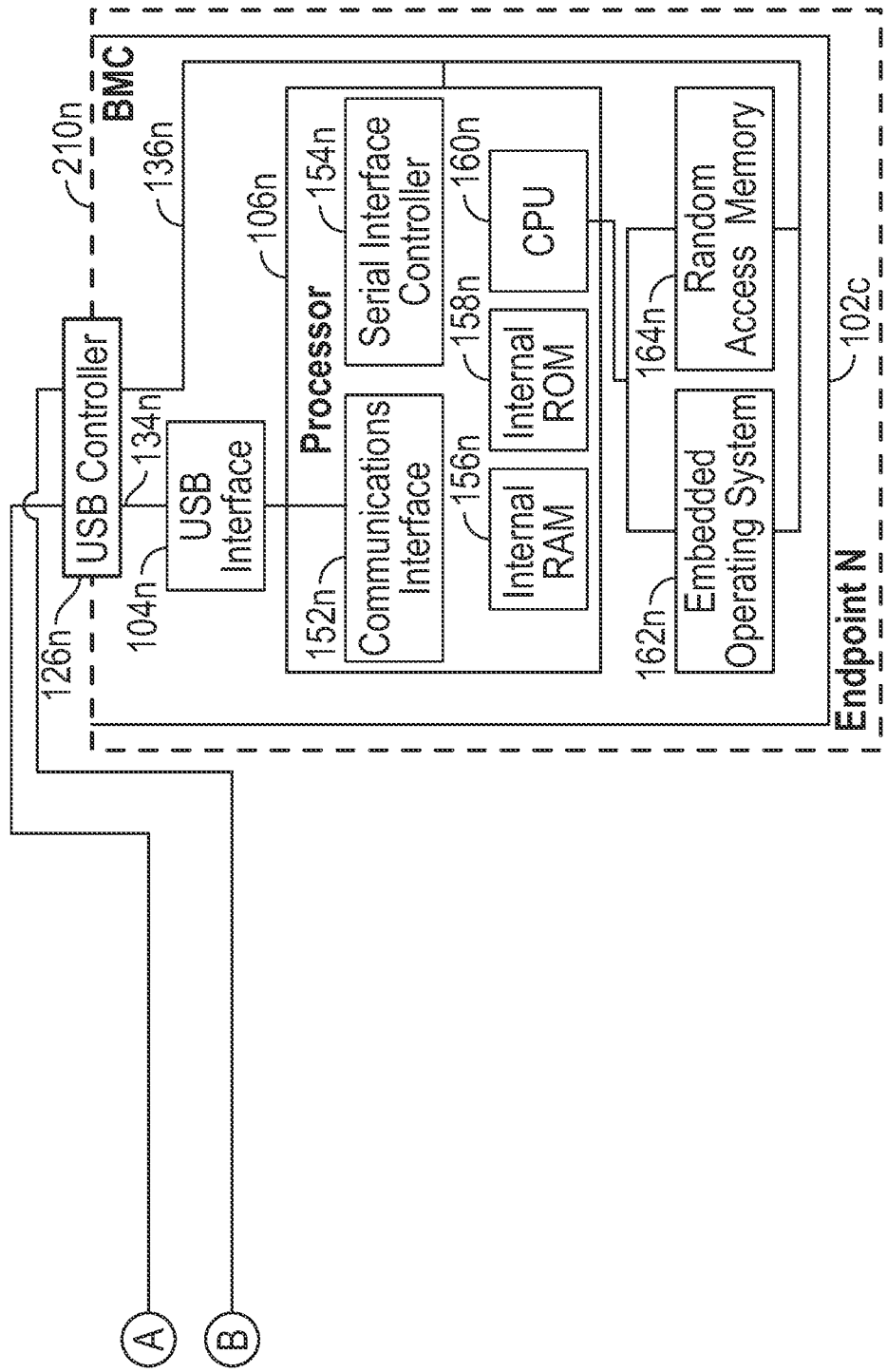

FIGS. 2A & 2B are another illustration of system 100 for providing a USB terminal server, according to embodiments of the present disclosure.

In FIG. 2A & 2B, the USB terminal server of system 100 may be represented by USB terminal server 200. USB terminal server 200 may include any suitable combination of motherboard 110, BMC 102, or one or more of USB subassemblies 120. USB terminal server 200 is illustrated as having a communications interface 140 with terminal client 140 over any suitable connection 142, as well as multiple endpoint USB connectors 126. Moreover, USB server 200 may include a terminal manager circuit 204 and programmable power supply 208. Terminal manager circuit 204 and programmable power supply 208 may be implemented by instructions in the medium for execution by a processor (now shown), a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

USB terminal server 200 can be connected to any suitable number and kind of USB endpoints 210 using multiple endpoint USB connectors 126 of one or more USB subassemblies 120. USB endpoints 210 may be implemented by any suitable electronic device with a USB connection. A given USB endpoint 210 may include an instance or a variation of BMC 102. A given USB endpoint 210 may include USB power signal lines 136 to processor 106, embedded operating system 162, and RAM 164.

Shading of endpoint 210N may denote that endpoint 210N may be completely powered down—i.e., no server components are locally powered from within endpoint 210N. This may prevent the reception of any "wake-up" signaling on external USB data connection 134, such as ACPI state G3.

Terminal client 140 can communicate to USB terminal server 200 via serial interface 142 connected to communications interface 111. Data from terminal client 140 may be sent from communications interface 111 to terminal manager circuit circuit 204. From terminal manager circuit 204, commands from terminal client 140 can be forwarded to multiple endpoints 210 through USB connectors 126 via USB serial data lines.

In certain circumstances, USB commands sent from terminal client 140 (via USB terminal server 200) may not get a response from a given destination server BMC 102. This may occur when an endpoint, such as server 210N, has no local power. In such a case, USB terminal server 200 can be instructed to supply power to an unresponsive USB interface, such as interface 104N. Terminal manager circuit 204 may instruct programmable power supply 208 to supply power, using endpoint USB power signal lines 136, to a specific USB connector through, for example, signal line 136N in endpoint 210N. Destination endpoint 210N and its BMC 102N may be constructed such that it can accept local power or power from a USB power interface over signal lines 136. In the case of endpoint 210N, when power is supplied via signal lines 136N, it may be sufficient to allow destination endpoint 210 and its BMC 102N to become fully functional, even though there is no local power available in, for example, ACPI state G3. Upon detecting external power over signal lines 136, BMC 102N may first only activate a console program and then wait for a console connection request. Once such a request has been received, BMC 102N can then respond to the subsequent commands sent from terminal manager 204, or complete its power up programming instructions autonomously.

The power supplied from USB terminal server 200 via signal lines 136 to USB interface 140 may be sufficient to power all of the components of BMC 102 in destination endpoint 210. Destination endpoint 210 may be configured to use embedded operating system 162 to boot into an operational mode. This may include allowing CPU 160 to communicate, via USB interface 104 and signal lines 134, with terminal manager circuit circuit 204. Terminal manager circuit circuit 204 can then either communicate directly with destination endpoints 210, or, using communication interface 111 and signal lines 142, connect external terminal client 140 to destination endpoint 210. Later, terminal manager circuit circuit 204 can instruct programmable power supply 208 to remove power from specific endpoint USB connectors 126. This may cause the selected BMC 102 of the destination server endpoint 210 to power down to a completely powered down state.

Terminal manager circuit 204 can attempt to make a serial console connection to endpoints 210 using signal lines 134. If a corresponding BMC 102 of a given endpoint 210 is operating, then BMC 102 may respond to such a request. However, if no response is made, a corresponding BMC 102 may have a lack of local power. USB terminal server 200 may, when requested, apply power using programmable power supply 208 to any specific USB connector 126 and signal lines 136 to attempt to power up a given endpoint 210. If an endpoint 210 is fully operational i.e. actively using local power, then no power will be supplied by programmable power supply 208 as it might not be required. A response by endpoint 210 to a serial console connection request from terminal manager circuit 204 may be an acknowledgement that BMC 102 of endpoint 210 is powered and operational.

USB terminal server 200 may sequentially test connectivity to all BMCs 102 of endpoints 210. Terminal manager circuit 204 may sequentially test connectivity to each destination endpoint BMC 102 via endpoint USB connectors 126 and signal lines 134. As mentioned above, terminal manager circuit 204 can request power to be applied to a USB interface under test if no response is received from the corresponding BMC 102. Connectivity to destination server BMCs 102 for which power is supplied may then be verified. Once tested, power to destination server BMCs 102 can be removed. The result of this test may be recorded for each endpoint 210. Using this sequential method, all connected endpoints 210 can be periodically tested. This may be used to generate a list of powered-down servers together with a status of their last operational test. During the period when a BMC 102 is powered, it may send the configuration of a tested endpoint 210. This information can also be added to the list of servers. External display indicators 132 can be set to show the status of a destination endpoint.

In some cases, a powered down endpoint 210 may need to be made operational. USB terminal server 200 may receive an instruction, via signal lines 142, to power up a given endpoint 210. This may be performed for example, to replace a different failing endpoint, replace an already failed endpoint, or to add additional capacity to an existing server cluster. This instruction received by USB terminal server 200 may include configuration information for the new server to be added. Terminal manager circuit 204 can review a list of endpoints 210, wherein the list, as discussed above, identifies those endpoints 210 that are powered-down and available configurations of each. Terminal manager circuit 204 may select a functional, powered-down endpoint 210 that meets or best meets a configuration requirement. This may allow terminal manager circuit 204 to initiate a power-up sequence by applying power, using programmable power supply 208 and signal lines 136, to the targeted powered-down endpoint 210. After a target BMC 102 of the targeted endpoint 210 has successfully initiated the local power sequence and has local power, terminal manager circuit 204 can remove USB power to BMC 102, using programmable power supply 208 and signal lines 136.

Terminal manager circuit 204 can be queried at any suitable time, using communications interface 111 and signal lines 142, to upload a list of powered down servers among endpoints 210 and the most recent status of each. This information may be used by a downstream process of terminal client 140 to provide alerting information regarding powered down servers that failed a USB connectivity check. For example, the information may be used by terminal client 140 or on behalf of terminal client by using IPMI or a mobile phone application to notify users of the system.

In response to a determination that an endpoint 210 is not responsive, terminal manager circuit 204 may take any suitable corrective action. For example, as discussed above, terminal manager circuit 204 may attempt to power up the endpoint 210 through, for example, establishing a console connection. If the console connection is successful, in one embodiment terminal manager circuit 204 may maintain power to endpoint 210 wherein endpoint 210 is to be used. If the console connection is not successful, terminal manager circuit 204 may take further corrective action. For example, as discussed above, terminal manager circuit 204 may record that endpoint 210 is not operational, or that endpoint 210 was operational but not powered on. Furthermore, terminal manger circuit 204 may alert users or software of the status of endpoint 210.

Figure 3:
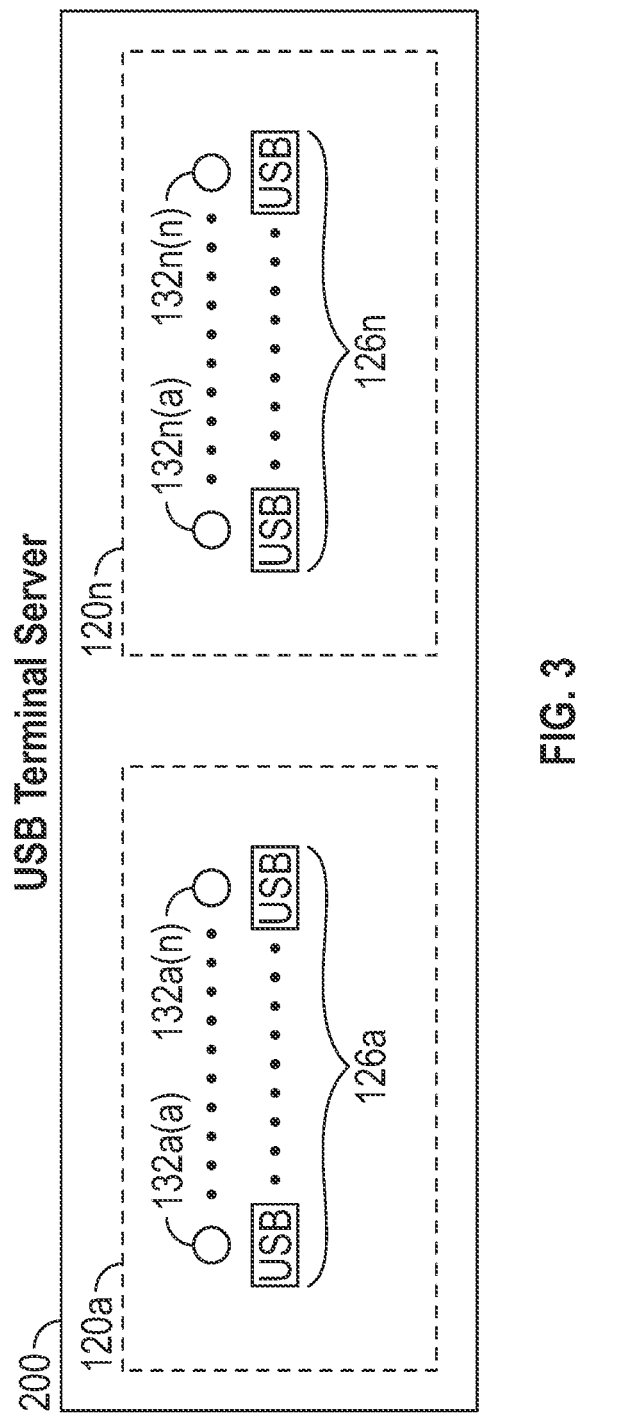
FIG. 3 is an illustration of displays of the USB terminal server, according to embodiments of the present disclosure.

FIG. 3 is an illustration of displays of USB terminal server 200, according to embodiments of the present disclosure. USB terminal server 200 may include set of displays 132 that are associated with individual USB connectors from various subassemblies 120. The connectors are grouped together according to each subassembly 126. BMC 102 of USB terminal server 200 may be configured to control these displays individually. The displays can be used to show the state of an endpoint 210 attached to a specific USB connector 126. In addition to showing an active USB connection, these displays can also show that a powered down endpoint 210 has passed or failed its last operational test as performed by USB terminal server 200 to attempt to connect or power up the associated BMC 102 of endpoint 210.

These displays may allow a technician to readily identify a powered down server among endpoints 210 that failed its last operational test. The endpoint 210 can then be removed for further testing without applying power to a server and potentially damaging it.

Figure 4:
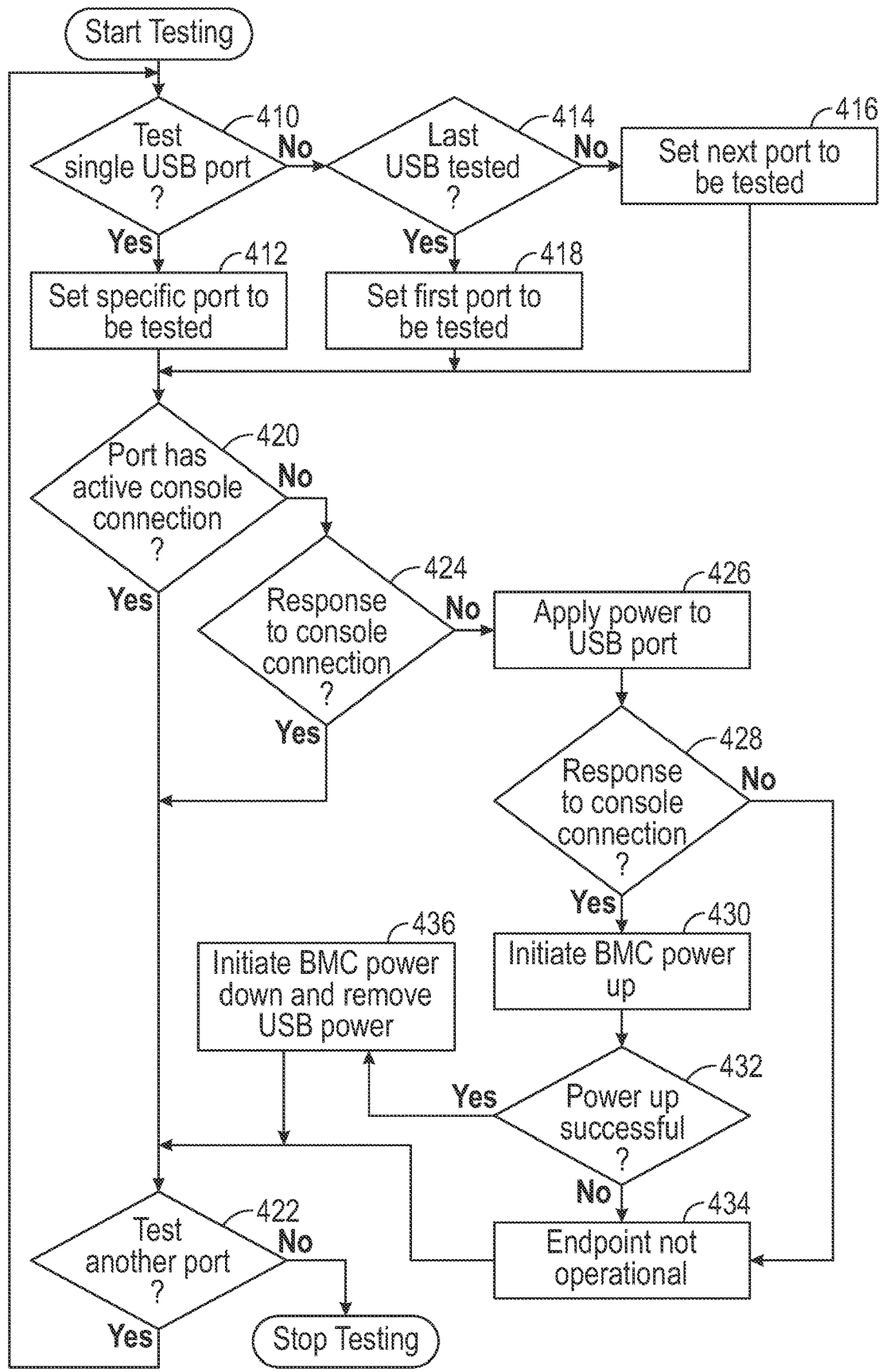
FIG. 4 shows a flowchart for an exemplary testing sequence, according to embodiments of the present disclosure.

FIG. 4 shows a flowchart for an exemplary testing sequence, shown as a method 400, according to embodiments of the present disclosure.

At step 410, terminal manager circuit 204 may determine if a single USB port test has been requested or sequential testing is requested. If a single port is selected, method 400 may proceed to step 412. Otherwise, method 400 may proceed to step 414.

At step 412, the specific requested port may be selected by terminal manager circuit 204. Method 400 may proceed to step 420.

At step 414, it may be determined whether a final or last enumerated port in terminal server 200 has been tested. If it has, method 400 may proceed to step 418. Otherwise, method 400 may proceed to step 416.

At step 416, a next port in terminal server 200 may be selected for testing. Method 400 may proceed to step 420.

At step 418, a first port in terminal server 200 may be selected for testing. Method 400 may proceed to step 420.

At step 420, terminal manger circuit 204 may determine if an active console session exists on the USB port to be tested. Since terminal server circuit 204 establishes console sessions, it can determine which USB ports are in use. If the USB port being tested is in use, then method 400 may proceed to step 422. Otherwise, method 400 may proceed to step 424.

At step 422, terminal server circuit 204 may determine if another port is to be tested. If no or ports are to be tested, then testing may cease. Otherwise, testing may start again. This may result in a loop of sequential testing. This may allow unpowered endpoints (e.g., ACPI state G3) to be frequently tested to ensure they are operational and ready for use when they are powered up. Method 400 may return to step 410.

At step 424, terminal manager circuit 204 may send a console connection request to the USB port under test. If the endpoint is powered and operating normally, terminal manager circuit 204 may receive a response. Thus, terminal manager circuit 204 may determine whether there is a response to a console connection request. If there is such a response, method 400 may proceed to step 422. Otherwise, method 400 may proceed to step 426.

At step 426, terminal manager 402, using programmable power supply 208 and signal lines 136, may supply operating power to specific BMC 102a-n associated with the USB port under test. BMC 102a-n may respond by only activating a console program and wait for a console connection request I.e not complete a full activation sequence.

At step 428, terminal manager circuit 204 may initiate a console connection request. If an acceptable response is received, then method 400 may proceed to step 430. In such a case, the specific BMC 102 under test may have failed to respond in step 424 because it was not powered on, but, after receiving power in step 426, may now be powered on and operating normally. Otherwise, method 400 may proceed to step 434. BMC 102 may be capable of responding to a console connection request before BMC 102 is fully operational. For example, the applied power in step 426 may be sufficient to activate a minimal set of functionalities that in turn is sufficient to provide a response in step 428. For example, BMC 102 may activate a serial console port when power is applied by terminal manager circuit 204 and await a subsequent console connection request before initiating a remaining power-up sequence.

At step 430, a corresponding BMC 102 may initiate its power up sequence after power has been detected on signal lines 136.

At step 432, the terminal manager may determine if the power up sequence is successful. This can include, but is not limited to, a successful establishment of a console connection. If power up is successful, then method 400 may proceed to step 436. Otherwise, method 400 may proceed to step 434.

At step 434, terminal manager circuit 204 may have determined that, since there is no response, the associated endpoint 210 is not operational. Terminal manager circuit 204 may add the associated endpoint to a list of endpoints that have been deemed non-operational. The list may be queried by terminal client 140. Method 400 may proceed to step 436.

At step 436, terminal manager may initiate a power-down sequence in the BMC 102. After a period of time, it may also, using programmable power supply 208 and signal lines 136, remove operating power to specific BMCs 102 associated with the USB port under test. Terminal manager circuit 204 may create a list of endpoints 210 that have been deemed operational but are powered down. The list may be queried by terminal client 140. Method 400 may proceed to step 436.

Embodiments of the present disclosure may include a USB server. The USB server may include a plurality of USB connectors, each connector configured to interface via USB to an endpoint server. The USB server may include a terminal manager circuit configured to issue a command to a first endpoint server via a selected one of the plurality of USB connectors, the selected one of the plurality of USB connectors associated with and connected to the first endpoint server, determine whether a response has been received to the command, and, based on a determination that no response has been received to the command, attempt to power up the first endpoint server through the selected one of the plurality of USB connectors.

In combination with any of the above embodiments, the terminal manager may be further configured to, based upon a determination that the first endpoint server has not been successfully powered up through the selected one of the plurality of USB connectors, determine that the first endpoint is non-operational.

In combination with any of the above embodiments, the terminal manager may be further configured to, based upon a determination that the first endpoint server has been successfully powered up through the selected one of the plurality of USB connectors, determine that the first endpoint is operational.

In combination with any of the above embodiments, the terminal manager may be further configured to, based upon a determination that the first endpoint server has been successfully powered up through the selected one of the plurality of USB connectors, maintain power to the first endpoint server to use the first endpoint server.

In combination with any of the above embodiments, the terminal manager may be further configured to, based upon a determination that the first endpoint server has been successfully powered up through the selected one of the plurality of USB connectors, configure the first endpoint server to boot itself and replace another server asset.

In combination with any of the above embodiments, the command may be an attempt to establish a console connection.

In combination with any of the above embodiments, the attempt to power up the first endpoint server may be a console connection.

Although example embodiments have been described above, other variations and embodiments may be made from this disclosure without departing from the spirit and scope of these embodiments.

We claim:

1. A universal serial bus (USB) server, comprising:
   a plurality of USB connectors, each connector configured to interface via USB to an endpoint server; and
   a terminal manager circuit configured to:
   issue a command to a first endpoint server via a selected one of the plurality of USB connectors, the selected one of the plurality of USB connectors associated with and connected to the first endpoint server, the command configured to elicit a response from the first endpoint server over USB;
   determine whether a response has been received to the command; and
   based on a determination that no response has been received to the command, attempt to power up the first endpoint server through the selected one of the plurality of USB connectors, including to provide power through USB signal lines through the selected one of the plurality of USB connectors.

2. The USB server of claim 1, wherein the terminal manager is further configured to, based upon a determination that the first endpoint server has not been successfully powered up through the selected one of the plurality of USB connectors, determine that the first endpoint is non-operational.

3. The USB server of claim 1, wherein the terminal manager circuit is further configured to, based upon a determination that the first endpoint server has been successfully powered up through the selected one of the plurality of USB connectors, determine that the first endpoint is operational.

4. The USB server of claim 3, wherein the terminal manager circuit is further configured to, based upon a determination that the first endpoint server has been successfully powered up through the selected one of the plurality of USB connectors, maintain power to the first endpoint server to use the first endpoint server.

5. The USB server of claim 3, wherein the terminal manager circuit is further configured to, based upon a determination that the first endpoint server has been successfully powered up through the selected one of the plurality of USB connectors, configure the first endpoint server to boot itself and replace another server asset.

6. The USB server of claim 1, wherein the command is an attempt to establish a console connection.

7. The USB server of claim 1, wherein the attempt to power up the first endpoint server is a console connection.

8. A method, comprising, in a USB apparatus, the USB apparatus the include a plurality of USB connectors, each connector configured to interface via USB to an endpoint server:
   issuing a command to a first endpoint server via a selected one of the plurality of USB connectors, the selected one of the plurality of USB connectors associated with and connected to the first endpoint server, the command configured to elicit a response from the first endpoint server over USB;

determining whether a response has been received to the command; and based on a determination that no response has been received to the command, attempting to power up the first endpoint server through the selected one of the plurality of USB connectors, including to provide power through USB signal lines through the selected one of the plurality of USB connectors.

9. The method of claim 8, further comprising, based upon a determination that the first endpoint server has not been successfully powered up through the selected one of the plurality of USB connectors, determine that the first endpoint is non-operational.

10. The method of claim 8, further comprising, based upon a determination that the first endpoint server has been successfully powered up through the selected one of the plurality of USB connectors, determine that the first endpoint is operational.

11. The method of claim 10, further comprising, based upon a determination that the first endpoint server has been successfully powered up through the selected one of the plurality of USB connectors, maintain power to the first endpoint server to use the first endpoint server.

12. The method of claim 10, further comprising, based upon a determination that the first endpoint server has been successfully powered up through the selected one of the plurality of USB connectors, configure the first endpoint server to boot itself and replace another server asset.

13. The method of claim 8, wherein the command is an attempt to establish a console connection.

14. The method of claim 8, wherein attempt to power up the first endpoint server is a console connection.

15. An article of manufacture, comprising a machine-readable medium, the medium including instructions, the instructions, when loaded and executed by a processor, cause the processor to:

issue a command to a first endpoint server via a selected one of a plurality of USB connectors, the selected one of the plurality of USB connectors associated with and connected to the first endpoint server, the command configured to elicit a response from the first endpoint server over USB;

determine whether a response has been received to the command; and based on a determination that no response has been received to the command, attempt to power up the first endpoint server through the selected one of the plurality of USB connectors, including to provide power through USB signal lines through the selected one of the plurality of USB connectors.

16. The article of claim 15, further comprising instructions to cause the processor to, based upon a determination that the first endpoint server has not been successfully powered up through the selected one of the plurality of USB connectors, determine that the first endpoint is non-operational.

17. The article of claim 15, further comprising instructions to cause the processor to, based upon a determination that the first endpoint server has been successfully powered up through the selected one of the plurality of USB connectors, determine that the first endpoint is operational.

18. The article of claim 15, further comprising instructions to cause the processor to, based upon a determination that the first endpoint server has been successfully powered up through the selected one of the plurality of USB connectors, maintain power to the first endpoint server to use the first endpoint server.

19. The article of claim 15, further comprising instructions to cause the processor to, based upon a determination that the first endpoint server has been successfully powered up through the selected one of the plurality of USB connectors, configure the first endpoint server to boot itself and replace another server asset.

20. The article of claim 15, wherein the command is an attempt to establish a console connection.

21. The article of claim 15, wherein attempt to power up the first endpoint server is a console connection.

* * * * *